Patented Jan. 11, 1944

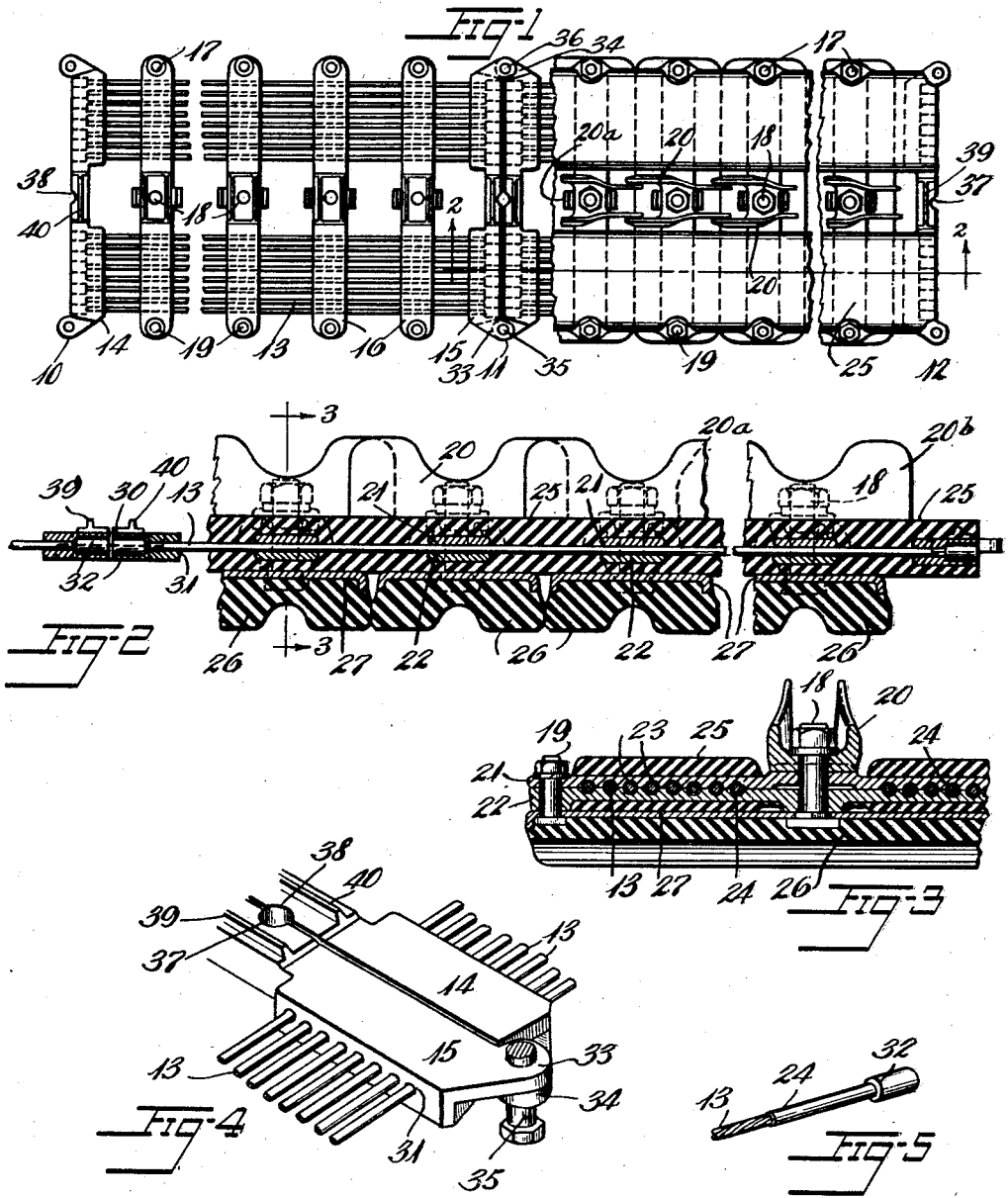

2,338,819

UNITED STATES PATENT OFFICE 2,338,819

SEPARABLE TRACK FOR SELF-LAYING TRACK TYPE VEHICLES

Robert Mayne, Akron, and Carl D. Berry, Wadsworth, Ohio, assignors to The B. F. Goodrich Company, New York, N. Y., a corporation of New York Application May 9, 1942, Serial No. 442,296

6 Claims. (Cl. 305—10)

This invention relates to separable track for self-laying track type vehicles and is especially useful in the construction of tractors, excavating machines, military tanks, and the like.

Where vehicles such as military tanks, trucks, tractors, excavating machines, or the like, are to be operated over soft ground, it has been proposed to provide them with propelling and supporting means of the self-laying track or crawler type in which an endless track or belt contacts the ground over a great area and the vehicle is supported therefrom by bogie wheels while power is transmitted to the track by sprockets or other driving means on the vehicle engaging the track. It has been found that the track is sometimes damaged locally especially during military operations, and repair in such cases is greatly facilitated by the provision of a separable construction such that a portion of the track can be replaced without requiring replacement of the whole track.

The present invention aims to overcome these difficulties and to provide an improved separable track in which a damaged section may be quickly replaced.

The principal objects of the invention are to provide convenience of repair and replacement, to provide a flexible track having an improved separable coupling, to provide a track of conveniently replaceable sections, and to provide effectively for strength with facility of repair.

These and other objects will appear from the following description and the accompanying drawing.

Of the drawing,

Fig. 1 is a plan view of a portion of the track showing a pair of connected track sections, the rubber-like body being broken away from one track section and from a portion of the adjoining track section to show the metal parts.

Fig. 2 is a sectional view, taken on line 2—2 of Fig. 1.

Fig. 3 is a transverse section, taken on line 3—3 of Fig. 2, parts being broken away.

Fig. 4 is a perspective view of a portion of the connecting members and cables, parts being broken away.

Fig. 5 is a perspective view of a cable end with a ferrule attached thereto.

Referring to the drawing, the track is of sections connected to each other as at 10, 11, 12 by coupling or connecting members. Each section has a flexible tension band of tension elements, such as the parallel spaced-apart cables 13, extending lengthwise thereof and anchored in connecting members 14, 15 at the ends thereof.

In the form of the invention illustrated, the longitudinal cables 13 are arranged in closely spaced groups at each side of the band. Cross-bars 16 extend across the bands of cables at intervals longitudinally of the track between the connecting members and are secured thereto by bolts 17, 18, 19. The bolts 18 pass through the bars between the groups of cables and are used to secure wear and guide plate members 20, while also securing the cross-bars to the cables. The cross-bars are each made of pairs of mating cross-bar elements 21, 22 through which the bolts pass. Half-round grooves 23 are formed in the meeting faces of the cross-bar elements to receive the cables which may be insulated therefrom by a cushioning layer 24 of rubber-like material surrounding them and bonded to the cables and elements in a manner to transmit driving stress by shear stress of the material.

A body 25 of resilient rubber-like material may enclose the cables and portions of the cross-bars to protect them against wear and corrosion. Additional means may be provided for resisting wear and providing traction and for this purpose, in the event cleats or shoes of metal are not desired, removable wear shoes 26 of rubber-like material vulcanized to metal shoe plates 27 may be secured over the body 25 on the tread side by the bolts 17, 18, 19, the bolts having their heads fixed in the shoe plates 27 against rotation.

For securing the cables 13 to the connecting members 14, 15 each connecting member is formed with a mortice 30 in its outermost face and a set of apertures 31 are provided through the innermost face connecting with the mortice and spaced to receive the ends of the cables, the apertures being large enough to clear the cushioning rubber covering 24 of the cables. Each cable extends through an aperture and has a ferrule 32 secured to its end and seated in the mortice, the group of ferrules on the ends of each set of cables substantially filling the mortice. The connecting members are secured together with their morticed outermost faces abutting each other and for holding them in proper alignment the members are formed at their ends with overlapping ears 33, 34 apertured to receive connecting bolts 35, 36 passing vertically through aligned apertures therethrough. The connecting members are also formed on their outermost or meeting faces between groups of cables with half-round grooves 37, 38 which, when the members are assembled, define a bolt-opening for securing a wear and guide plate member 20. The guide plate member straddles the connecting members to hold them together. The connecting members are also formed on their upper faces with dowel ridges 39, 40 which interlock with corresponding grooves formed in the wear and guide plate member 20 to further prevent accidental separation.

The meeting faces of the ears 33, 34 are preferably located on the central plane of the cables so as to be at the neutral axis thereof and the shear load on the bolts 35, 36 is applied therefor at the plane of the neutral axis avoiding any tilting of the connecting members. The location of the ears at the margins of the track facilitates removal and replacement as the bolts 35, 36 are readily accessible.

The connecting members 14, 15 are positioned with respect to the cross-bars 16 so that the wear and guide members 20 mounted on the bars and the connecting members, which are also utilized for driving the track by engagement with sprocket teeth, are equally spaced at intervals corresponding to the pitch of the sprockets and all of the wear and guide plate members 20 are of uniform dimensions. The connecting members may be reduced in thickness in a longitudinal direction of the track, at the position where they are engaged by the wear and guide plate members 20 but are made relatively thick in that direction between the guide plate seat and their outer bolted ends to provide adequate stiffness.

The ferrules 32 may be secured to the cable ends in any manner, as by contracting them in place on the cables, or by welding or brazing the cables to them, it is preferred, however, to contract the ferrules about the cables by crimping or swaging them about the cables. The rubber-like cushioning material of the body is forced into the mortice about the ferruled cable ends during molding of the rubber body and assists in holding them in place in the mortice.

With the connecting members bolted together, the ferrules are confined in the opposed mortices with the ferrule of the cables of one section abutting against the ferrules of the cables of the next section.

When the tread shoes 26 are employed at the connecting members, their bolts 17, 18, 19 may be used to secure the track sections in the ears at the margins and in the center of the bars.

The overlapping wear and guide plate members 20 may be of the same construction as those disclosed in the Mayne Patent No. 2,107,490, of February 8, 1938, having a wear surface 20a to engage the sprockets and pairs of guide plates 20b, 20b, arranged to engage a guiding groove in a drive pulley, the guide plates on successive cross-bars being adapted to overlap to prevent side sway of the track.

In forming the track, the cables are arranged in proper spaced relation and the connecting members 14, 15 are strung on the cables the apertures for the cable being sufficient in size to permit adjustment of the connecting members along the cables over the rubber covering thereon. The cable reaches are then placed under uniform tension and the ferrules are contracted about the cables at the proper positions. The rubber covering may be removed from the cables at the positions where the ferrules are to be contracted. After the ferrules are fixed to the cables, the connecting bars are moved along the cables into positions engaging over the ferrules. The cross-bars may then be secured to the cables between the connecting members and the rubber-like material for the body may be built in place and the track vulcanized in a mold.

Where desired, a plurality of track sections or a complete track may be assembled and molded as an assembly of sections with the cables extending continuously therethrough and after the molding operation, the cables may be cut apart between the connecting members 14, 15 to provide track sections. This method provides for tensioning long lengths of cable uniformly throughout a plurality of sections.

Where the track is damaged in use, the damaged section may be removed and a new section inserted in the track without removing the track from the vehicle as the bolts are readily accessible at the margins of the track.

Variations may be made without departing from the scope of the invention as it is defined by the following claims.

We claim:

1. A separable self-laying track comprising a jointless flexible body having ends adapted for detachable connection, said body comprising a flexible tension structure, a plurality of cross-bars at spaced-apart positions along said tension structure and secured thereto, and connecting members secured to said tension structure at the ends thereof, said connecting members having overlapping apertured ears integral with said members at the margins of the track, and means engaging said ears for securing said connecting members to each other.

2. A separable self-laying track comprising a jointless flexible body having ends adapted for detachable connection, said body comprising resilient rubber-like material, a flexible tension structure embedded in said material, said tension structure comprising a plurality of laterally spaced-apart reaches of metallic cable secured to said body by vulcanized adhesion and extending longitudinally of the track with their axes substantially in a single plane, a plurality of cross-bars at spaced-apart positions along said tension structure and resiliently secured thereto by intervening rubber-like material, and connecting members secured to said tension structure at the ends thereof, said connecting members having apertured ears integral with said members at the margins of the track overlapping substantially in said plane, and bolts engaging through said ears for securing said connecting members to each other.

3. A separable self-laying track comprising separable jointless flexible sections, each section comprising laterally spaced-apart longitudinal cable elements, cross-bars secured at intervals to the cable elements, connecting members secured to the ends of said cable elements, said connecting members having apertured flat-faced ears at the margins of the track, and bolt means for securing together the overlapping ears of adjoining sections.

4. A separable self-laying track comprising separable jointless flexible sections, each section comprising a flexible tension structure, cross-bars secured at intervals along said structure, connecting members secured to the ends of said structure, said connecting members having apertured ears integral with said members at the margins of the track for securing them to the members of adjoining sections in overlapping relation by bolts passing through the overlapped ears, said ears being adapted to overlap at substantially the neutral plane of said structure.

5. A separable self-laying track comprising separable sections, each section comprising laterally spaced-apart longitudinal cable elements, cross-bars secured at intervals to the cable elements, connecting members secured to the ends of said cable elements, and a body of resilient rubber-like material surrounding said cable elements and portions of said cross-bars and connecting members, said connecting members having apertured ears at the margins of the track for securing them to the members of adjoining sections in overlapping relation by bolts passing through the overlapped ears, said connecting members having mortices in their meeting faces, and said cables having ferrules secured to their ends and confined in said mortices.

6. A separable self-laying track comprising separable sections, each section comprising laterally spaced longitudinal tension members, cross-bars secured at intervals to the tension members, connecting members secured to the ends of said tension members, and a body of resilient rubber-like material surrounding said tension members and at least portions of said cross-bars and connecting members, said connecting members having flat-faced ears extending therefrom at the margins of the track for securing them face-to-face to the connecting members of adjoining sections in overlapping relation, means engaging the overlapped ears for thus securing them, said connecting members having apertures for receiving said tension members, and said tension members having means for anchoring their ends in said apertures.

ROBERT MAYNE.
CARL D. BERRY.